United States Patent

Buijsse

[19]

[11] Patent Number: 6,027,030

[45] Date of Patent: Feb. 22, 2000

[54] HUMIDFYING SYSTEM AND PROCEDURES FOR ITS OPERATION AND APPLICATION FOR CONDITIONING THE AIR IN PAINT OR LACQUERING ROOMS

[75] Inventor: Harold Theo Agnes Buijsse, Aardenburg, Netherlands

[73] Assignee: Spray Systems Europe AGRIMA-Sse-B.V., Aardenburg, Netherlands

[21] Appl. No.: 09/075,724

[22] Filed: May 11, 1998

[51] Int. Cl.[7] ................................ B01F 3/02; G05D 21/00
[52] U.S. Cl. ......................... 236/44 C; 62/171; 62/176.4; 165/229
[58] Field of Search ................................ 236/44 A, 44 C; 62/176.4, 171; 165/229, 224; 261/DIG. 34

[56] References Cited

U.S. PATENT DOCUMENTS

| | | | |
|---|---|---|---|
| 3,198,433 | 8/1965 | Crutcher | 236/44 R |
| 3,570,472 | 3/1971 | Santangelo | 126/113 |
| 3,635,210 | 1/1972 | Morrow | 126/113 |
| 3,689,037 | 9/1972 | Payne | 261/105 |
| 3,770,254 | 11/1973 | Morrow | 261/105 |
| 3,774,588 | 11/1973 | Yeagle | 126/113 |
| 3,776,215 | 12/1973 | Howard et al. | 126/113 |
| 3,802,161 | 4/1974 | Talbert | 126/113 |
| 3,855,371 | 12/1974 | Morrow et al. | 261/100 |
| 3,900,301 | 8/1975 | Constantinescu et al. | 62/314 X |
| 3,923,482 | 12/1975 | Knab et al. | 261/26 X |
| 3,990,427 | 11/1976 | Clinebell | 126/113 |
| 4,042,016 | 8/1977 | Boochever et al. | 126/113 X |
| 4,078,480 | 3/1978 | Luck | 99/476 |
| 4,272,014 | 6/1981 | Halfpenny et al. | 236/44 B |
| 4,290,274 | 9/1981 | Essex | 62/171 X |
| 4,365,619 | 12/1982 | Holbrook et al. | 261/151 X |
| 4,367,787 | 1/1983 | Bradshaw | 165/59 X |
| 4,494,596 | 1/1985 | Bradshaw | 261/153 X |
| 4,508,551 | 4/1985 | Ruoss et al. | 55/392 X |
| 4,572,428 | 2/1986 | Groff et al. | 62/176.4 |
| 4,747,980 | 5/1988 | Bakay et al. | 261/129 |
| 4,879,075 | 11/1989 | Hinton | 261/26 |
| 4,906,417 | 3/1990 | Gentry | 261/30 |
| 4,913,856 | 4/1990 | Morton | 261/116 |
| 4,967,726 | 11/1990 | Finch | 237/48 X |
| 4,967,728 | 11/1990 | Dueck | 126/113 |
| 5,463,873 | 11/1995 | Early et al. | 236/44 A |
| 5,497,628 | 3/1996 | Stueble | 62/91 |
| 5,525,268 | 6/1996 | Reens | 261/78.2 |
| 5,620,503 | 4/1997 | Miller et al. | 261/43 X |
| 5,699,983 | 12/1997 | Ellsworth | 244/118.5 |
| 5,740,790 | 4/1998 | Lipsky | 126/113 |
| 5,762,661 | 6/1998 | Kleinberger et al. | 261/116 |

OTHER PUBLICATIONS

Spray Systems Europe Brochure regarding SSE humidification, date and author unknown.

*Primary Examiner*—William Wayner
*Attorney, Agent, or Firm*—Harness, Dickey & Pierce, P.L.C.

[57] ABSTRACT

A humidifying system containing at least one compressed-air sprayer with a compressed-air input, a water input and an outlet valve for compressed air and water, compressed-air pressure regulators for regulating the pressure of the compressed air that is to be inputted, water pressure regulators for regulating the pressure of the water that is to be inputted, and at least one humidity sensor for measuring the humidity of the air that is humidified or that is to be humidified. The humidifying system also has controls which are actively connected to compressed air pressure regulators and/or water pressure regulators and to the humidity sensor (of which there is at least one). The controls are set up to regulate (depending upon the humidity picked up by the humidity sensor) the difference between the water pressure and the pressure of the compressed air by appropriately controlling the compressed-air pressure and/or water pressure such that the size of the drops from the sprayer vary depending upon the humidity picked up by the humidity sensor of which there is at least one. Use is preferably made of a compressed-air sprayer in which the pressure of the water is higher than or is equal to the pressure of the compressed air. This invention is also concerned with a procedure for operating such a humidifying system and with the application of such a humidifying system in a paint or lacquering cabin, such as one that is used for lacquering cars.

15 Claims, 4 Drawing Sheets

HUMIDFYING SYSTEM AND PROCEDURES FOR ITS OPERATION AND APPLICATION FOR CONDITIONING THE AIR IN PAINT OR LACQUERING ROOMS

FIELD OF THE INVENTION

The present invention relates to a humidifying system for use in conditioning air in paint or lacquering rooms. More particularly, the present invention relates to a humidifying system which contains at least one compressed-air sprayer with a compressed-air input, a water input and an outlet for compressed air and water, compressed-air pressure regulators for regulating the pressure of the compressed air that is to be inputted and/or water pressure regulators for regulating the pressure of the water that is to be inputted, at least one humidity sensor for sensing the humidity of the air that is either already humidified or is to be humidified, and controls for controlling the compressed-air sprayer of which there is at least one.

BACKGROUND OF THE INVENTION

Humidifying systems are generally known for controlling humidity in a paint or lacquer room. A humidifying system may, for example, include a compressed-air sprayer which works according to the Venturi principle in which compressed air with a relatively high pressure sucks in water with a relatively low pressure through an input valve. In order to keep the pressure of the compressed air that is being used at a particular desired constant level, the system is also fitted with compressed-air pressure regulators to regulate the pressure of the compressed air that is to be inputted. Correspondingly, in order for the water pressure to be kept at a particular desired constant level, the system is fitted with water pressure regulators for regulating the pressure of the water that is to be inputted. These compressed-air pressure regulators and water pressure regulators ensure that any variations there may be in the pressure of the compressed air and/or water pressure that is to be inputted are not passed on to the compressed-air sprayer. In this way, any disruption to the processing conditions in the compressed-air sprayer can be counteracted. Equipment such as this is also fitted with at least one humidity sensor for measuring the humidity of the air that is already humidified or is to be humidified. Depending upon the humidity that is picked up by the humidity sensor, the compressed-air sprayer (of which there is at least one) will be switched on or off by the controls. If a number of compressed-air sprayers are fitted, a large or small number of them may be switched on or off, depending on the humidity that is picked up by the humidity sensor.

Known humidifying systems generally have a number of disadvantages. Each of the compressed-air sprayers is set up so that when it is active it sprays water which basically has the same size of drops under any processing conditions. Depending on the exact processing conditions, when spraying takes place these drops will evaporate to some degree, be it greater or lesser. When processing conditions are less favorable, the drops which remain unevaporated will usually be large in size, and these will often need to be caught using separate drip catchers. The drops which remain unevaporated do not actually make any contribution to increasing the humidity of the air that is to be humidified. This means that the yield of such humidifying systems is relatively low. From a certain size upwards, the large drops will either precipitate or condense on their own or will be caught in a drip catcher if one is applied. The water that is obtained in this way is drain water that can generally be removed. The drawback of recirculating this drain water (i.e., using it for spraying again) is that spraying it has many undesired characteristics such as encouraging the growth and spread of bacteria. Harmful effects such as these may, of course, be counteracted by purifying the drain water, for example. This, however, increases costs and certainly cannot always be achieved satisfactorily. Discharging the drain water into surface water or into sewers is increasingly being prohibited or adds additional cost. As will be clear, from the point of view of costs, purifying drain water before it is to be discharged is disadvantageous.

SUMMARY OF THE INVENTION

It is accordingly a primary object of the present invention to provide an improved type of humidifying system which overcomes the disadvantages of known systems.

This and other objects are achieved by having the controls actively linked to the compressed-air pressure regulators and/or the water pressure regulators and to the humidity sensor (of which there is at least one). It is also achieved through having the controls set up so that, depending on the humidity picked up by the humidity sensor, they are able to regulate the difference between the water pressure and the pressure of the compressed air by appropriately controlling the compressed-air pressure regulator and/or water pressure regulator in such a way that the size of drops in the spray from the sprayer vary depending on the humidity picked up by the humidity sensor of which there is at least one. With this invention, it somewhat surprisingly appears to be possible to vary the size of the drops present in the spray from the sprayer by regulating the difference between the water pressure and the pressure of the compressed air. It is possible to vary this depending on the humidity picked up by the humidity sensor (of which there is at least one). According to the present invention, it is possible to vary the size of the drops over a relatively large range, meaning that it has become possible to have a much greater influence on the processing conditions with a humidifying system like this than it is with state-of-the-art humidifying systems. With another special form of operation for this invention (which is to be discussed in greater detail below), the size of the drops themselves can be adjusted to within a range of 5–30 microns. However, other sizes of drops can be achieved, if so desired, including drops of between 70 and 100 microns in size, or even larger. By properly controlling the compressed-air pressure regulator and/or water pressure regulator, it is possible to regulate the size of drops in such a way that the amount of drain water is either greatly reduced or is eradicated completely. It will be clear, however, that the present invention makes possible a much wider range of options for controlling the processing conditions.

With this invention, the controls may be actively linked to the compressed-air pressure regulator and the water pressure regulator so that both pressures may be regulated at the same time. From a control point of view it would, however, be of greater benefit to make or keep the pressure constant, thereby making regulating it less complex and less reliant on memory and therefore quicker, possibly by having an autonomous extra control cycle for that purpose and to regulate the other pressure using the controls. With these features, it would be preferable to make or keep the pressure of the compressed air constant and to regulate the difference in pressure between the water pressure and the pressure of the compressed air by controlling the water pressure. The reason for this is that as a consequence of the compressible nature of compressed air, its properties and parameters depend greatly on the working pressure. As a result of that, a change in the pressure of the compressed air either affects or changes a relatively high number of system parameters. This is another factor which makes it more complicated to regulate the system efficiently and accurately using the aforementioned controls which are linked to it.

One beneficial way in which the invention works is that the humidity sensor (of which there is at least one) contains an outlet-humidity sensor for sensing the humidity of the humidified air. Another advantage is that the controls are set up so that the size of drops in the spray can be increased when the humidity sensed by at least one outlet-humidity sensor is or is becoming lower. Conversely, the size of the drops can also be reduced when the humidity that has been sensed is or is becoming higher. In being able to control the humidity sensor in such a way, account is taken of the fact that when the outlet-humidity is higher, the drops in the spray will not evaporate as easily. Therefore, in order to minimize condensation and precipitation as well as any drain water that there may be, the size of the drops will need to be reduced. An additional benefit of this is that as a result of their relatively large external surface (in relation to their volume), small drops evaporate better than large drops. Although a drawback in reducing the size of the drops is that the quantity of water that is to be sprayed with the compressed-air sprayer decreases over time, with this invention it seems—somewhat surprisingly—that the reduction in the size of the drops when there is an increase in the outlet-humidity does not necessarily lead to a decline in the efficiency of the humidifying system. On the contrary, it tends to lead to an improvement in it.

A further beneficial way that the present system works which may be put to very good use in combination with the one that has just been discussed is that when the humidity sensor (of which there is at least one) contains an inlet-humidity sensor for sensing the humidity of the air that is to be humidified, the controls may be set to increase the size of the drops in the spray when the humidity picked up by the inlet-humidity sensor is or is becoming lower. Conversely, the controls may be set to reduce the size of the drops as the humidity picked up by the inlet-humidity sensor is or is becoming higher. Such control of the compressed-air sprayer takes into account, and puts to good use, the fact that water does not evaporate as easily when the humidity of the air that the evaporated water needs to absorb is higher. In view of the effect discussed above (i.e., that as a result of their greater surface to volume relationship, larger drops do not evaporate as easily as smaller drops with a lower surface to volume relationship), being able to control the compressed-air sprayer in this way therefore minimizes condensation and precipitation as well as any drain water that there may be.

It is possible to put the humidifying system of the present invention to particularly good use if the nozzle or the compressed-air sprayer(s) is/are applied in the way intended. Such sprayer nozzles are conveniently available. The way compressed-air sprayers like this work is according to the so-called reversed Venturi principle. At the point at which the water and the compressed air come together, the water pressure is greater than or equal to the pressure of the compressed air. If the water pressure is equal to the pressure of the compressed air, the spraying will come to a stop. A humidifying system such as this one in which a compressed-air sprayer (of the type that has been sold by the applicant for several years now) is applied may be said to be a humidifying system of the type this invention describes. Within it, the compressed-air sprayer (of which there is at least one) contains an air chamber which has an outlet valve and which is connected to the compressed-air input. A water-jet nozzle is installed into the air chamber and lines up with it facing the outlet valve, and is connected to the water input.

This invention also has controls which can be set in such a way that they control the compressed-air pressure regulators and/or water pressure regulators so that the water pressure is greater than or is equal to the compressed-air pressure at a particular point in the air chamber close to the outlet of the water-jet nozzle. With this invention, it is beneficial for such a humidifying system when the controls which increase the size of the drops of the spray also control the water pressure regulators and/or compressed-air pressure regulators in such a way that the difference between the water pressure and the pressure of the compressed air increases at a particular point (considered to be in the air chamber, very close to the outlet of the water-jet nozzle) and that when they reduce the size of the drops, they control the water pressure regulators and/or compressed-air regulators in such a way that the difference is reduced. It is thereby possible to regulate the size of drops which emerge from these compressed-air sprayers to good effect by acting to control the pressure difference between the water pressure and the pressure of the compressed air. In this case, this is done by increasing the size of the drops when the difference in the water pressure minus the pressure of the compressed air increases and by reducing the size of the drops when the difference in the water pressure minus the pressure of the compressed air decreases.

With a humidifying system such as this invention, it is beneficial to have controls which can be set to regulate (mainly without interruption) the size of drops in the spray in order to maintain the humidity of the humidified air at a predetermined target value or to have it follow a set of predetermined target values. The accuracy with which this invention is able to perform such regulation of a humidifying system is appreciably greater than that for state-of-the-art humidifying systems in which regulation takes place by switching on a higher or lower number of the compressed-air sprayers that are available.

In order to totally or virtually eliminate condensation and precipitation as well as any drain water that there may be with a humidifying system such as that embodied in the present invention, it is beneficial to have controls which may be set so that the size of drops in the spray can be regulated in such a way that at a predetermined distance from the outlet valve of the compressed-air sprayer, at least 95% (though preferably 100% or nearly 100%) of the drops are smaller than the predetermined permissible maximum value. In a humidifying system such as that embodied in the present invention, it is possible to achieve such control under widely-varying processing conditions. In state-of-the-art humidifying systems, however, such control can only be achieved when the processing conditions either do not change or hardly change over time.

In certain applications (including those in lacquering rooms for private cars and trucks, for example), the presence in the humidified air of drops of more than a certain size is so undesirable that, as a safety measure, a drip catcher (which may be a demister, for instance) is set up downstream of the compressed-air sprayer. In cases where the type of use is that described above, in such a humidifying system the distance of the drip catcher from the outlet valve of the compressed-air sprayer will be greater than or equal to this predetermined distance and the predetermined maximum permissible value of the size of drop will be smaller than or equal to the size of drop that the drip catcher allows through. In a humidifying system according to the present invention, it is relatively easy to impose such preconditions on the controls that are applied to it.

A humidifying system according to the present invention lends itself to be very beneficially applied in an air duct. Features which distinguish a humidifying system such as this invention are that it also contains an air duct which may have air flowing through it in a particular direction, that the outlet valve of the compressed-air sprayer (of which there is at least one) points into the duct, that the humidity sensors comprise at least one inlet-humidity sensor for sensing the humidity of the inputted air that is to be humidified (and which is to be installed upstream of the sprayer) and at least one outlet-humidity sensor (which is to be installed downstream) for sensing the humidity of the removed, humidified air, and that the controls are set in such a way that the size of the drops being sprayed into the air duct increases as the difference in the humidity of the air picked up by the outlet-humidity sensor minus the humidity of the air picked up by the inlet-humidity sensor is (or is becoming) greater and decreases as the difference is (or is becoming) smaller. Taking into account the high or low ability of the drops to evaporate, with the controls set in such a way it will be possible to minimize condensation and precipitation as well as any drain water that there may be. The inlet humidity sensor (of which there may be at least one) which has been installed upstream may also be installed, either in the duct or outside it by the inlet. The outlet-humidity sensor may also be installed inside or outside the duct. For example, the sensor may be disposed in a target area that is to be conditioned.

In a humidifying system according to the present invention which has a duct installed, it is also possible to heat the air that is carried through the duct. This heating will generally take place in order to bring the temperature of the air being carried through the duct up to a temperature that is desired in the target area that is to be conditioned. According to the present invention, it is particularly beneficial on this point when the heaters for warming the air being carried through and which is to be humidified are installed upstream from the compressed-air sprayer (of which there is at least one). It is also an advantage that the heaters are fitted with a temperature regulator which is set up so that the air that is to be humidified can be heated in advance to a temperature which generally corresponds with the temperature desired at the outlet of the air duct plus the absolute value of the fall in air temperature as a consequence of the heat being withdrawn from it due to the sprayed drops being heated. In this way, the temperature fall which takes place with spraying as a result of the evaporation of the water is compensated in a very beneficial way.

Since the spraying process can be efficiently and accurately modeled (in particular when applying compressed-air sprayers of the so-called reversed Venturi principle—as have been made commercially available by the applicant), the temperature regulator is able to operate independently of the controls and can therefore be disconnected from it. To this end, the temperature regulator will generally be fitted with humidity sensors for measuring the inlet-humidity and outlet-humidity of the humidifying system which may be the same as that which is used for the controls. It will also have at least one temperature sensor for measuring the temperature of the air prior to its being heated. The temperature regulator will generally be equipped with a model of the spraying process.

In order to be able to refine the regulating of the temperature, the present invention allows this feature when the temperature regulator and the controls are connected to one another or when the temperature regulator is integrated as part of the controls.

A humidifying system such as that of the present invention will generally contain a number of compressed-air sprayers. When it involves compressed-air pressure and water pressure, these compressed-air sprayers may be controlled as a single large group or in sub-groups. In such cases they are connected to a power supply which can be regulated by a single valve for regulating the compressed-air pressure and to one which can be regulated by a single valve for regulating the water pressure. In order to be able to optimize the precision in the way the humidifying system is regulated, with this invention it is beneficial when (in cases where the humidifying system contains a number of compressed-air sprayers), these compressed-air sprayers may each be controlled separately. Specifically, for each compressed-air sprayer the level of power being supplied for the compressed air and the water can be regulated independently of the level of power being supplied and/or water pressure to the other compressed-air sprayers.

The invention is also concerned with a method for operating a humidifying system of the type described. In particular, this invention is concerned with the application of a humidifying system of the type described for conditioning air—particularly its humidity—in a paint or lacquering room. More specifically, the system has application in a paint or lacquering room used for painting and lacquering vehicles such as cars.

According to the present invention, the functioning of the temperature regulator and controls may be performed in either analog or digital modes. When the performance is carried out digitally, micro-processors, computers, EPROMs and such may be incorporated.

With regard to the humidity sensors, it should be noted that, according to the present invention, these may be sensors which measure the relative humidity, the absolute humidity, the so-called wet-sphere temperature or any other equivalent measures. In general, the micro-processors and/or the temperature regulator will work with relative humidity. As fixed formulas are used, however, it is possible to determine this value unambiguously from the absolute humidity, the wet-sphere temperature or any other equivalents.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which.

DETAILED DESCRIPTION OF THE PREFERRED EMBODIMENT

The drawings disclose the preferred embodiment of the present invention. While the configurations according to the illustrated embodiment are preferred, it is envisioned that alternate configurations of the present invention may be adopted without deviating from the invention as portrayed. The preferred embodiment is discussed hereafter.

Figure 1:
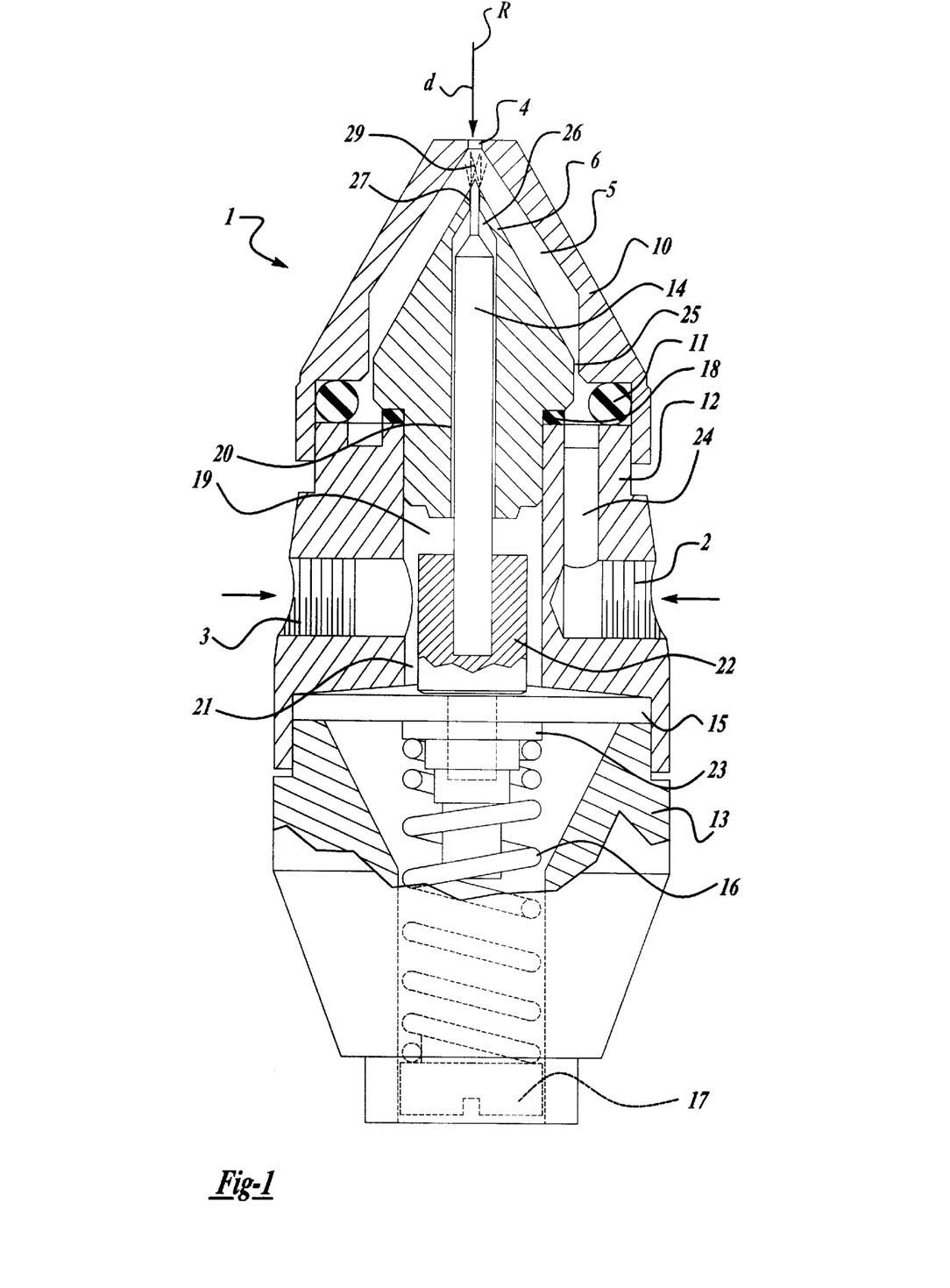
FIG. 1 is a cross-section of a compressed air sprayer, operating according to the so-called reversed Venturi principle.

FIG. 1 shows a compressed-air sprayer or nozzle of the so-called reversed Venturi principle. This sprayer has been commercially available from the applicant for several years now. This compressed-air sprayer 1 is fitted with a compressed-air inlet (or compressed-air input) 2 onto which a compressed-air pipe can be connected by means of a screw-thread connection. The compressed-air sprayer 1 is also fitted with a water inlet (or water input) 3, which also has a screw-thread connection for connecting to a water pipe. The compressed-air inlet 2 and water inlet 3 are formed in the main housing 12, onto which a cap 10 is fastened using a screw-thread connection. Between the main housing 12 and the cap 10 is a seal 11 in the form of a sealing ring. Within the cap 10 is an air chamber 5 into which a water-jet nozzle 6 comes out. This water-jet nozzle 6 is screwed fast in a bore 21 within the main housing 12. Between this main housing 12 and the water-jet nozzle 6, a seal 18 is fitted. The compressed air which enters via the compressed-air inlet 2 can flow into the air chamber 5 via a duct 24 and a slit 25. From the air chamber 5, the compressed air leaves the compressed-air spray via an outlet valve 4 for compressed air and water. Inputted water is able to leave the compressed-air sprayer via a water inlet 3, a space 19 and a bore 20, through the water-jet nozzle 6, a water-jet nozzle 26 and the upper side of the air chamber 5 through the outlet valve 4.

On its underside, the compressed-air sprayer 1 is fitted with a spring housing 13 which houses a spring 16. The springiness of this can be adjusted using a screw 17. The spring 16 is active on the underside of a membrane 15 on the upper side of which is a cleaning needle 14 which is attached by means of assembly parts 22 and 23. When sufficient water pressure breaks into the membrane 15, the membrane 15 is forced down against the action of the spring 16. This causes the cleaning needle 14 to move down in such a way that the cleaning point of it 27 completely releases the water outlet 26 of the water-jet nozzle 6. When the water pressure subsides or decreases sufficiently, the cleaning needle 14 rises to its original position and its cleaning point 27 will stick out through the water outlet 26. In that way it will remove dirt from the water outlet 26 and counteract any depositing of dirt, such as calcification, in the water outlet 26.

As has already been noted above, the compressed-air spray 1 works on the so-called reversed Venturi principle. What this principle amounts to is that in the area 29 where the water and the compressed air come together, the area 29 close to water outlet 26, the water pressure is higher than the pressure of the compressed air. It is understood that the water pressure and the pressure of the compressed air in the area 29 will be somewhat lower than the pressures in the water inlet 3 and the compressed-air inlet 2. This is as a consequence of the restrictions which are present in the compressed-air sprayer. The water outlet 26 is in line with the outlet valve 4 of the compressed-air sprayer itself. The jet of water which comes out of the water-jet nozzle 6 leaves the compressed-air sprayer 1 via the outlet valve 4 into an environment in which it is surrounded by compressed air. The compressed air surrounding the jet of water (mostly outside the compressed-air sprayer) has a destructive effect on the jet of water, causing it to break down into very fine drops. According to the present system, it somewhat surprisingly appears that the fineness of these drops can be regulated by acting to alter the difference in the water pressure minus the pressure of the compressed air (based on measurements taken in area 29). The more minor this pressure difference in area 29 becomes, the smaller the drops will be on average at a certain reference point outside the compressed-air sprayer than when this difference in pressure in area 29 is greater. One could take such a reference point (R) as being 1 meter from the sprayer (i.e., at a distance (d) of 1 meter in front of the outlet 4, and preferably right in front of the outlet 4).

It is possible to directly measure the water pressure and compressed-air pressure in area 29 by installing suitable sensors. This may be done on a continuous basis or at regular intervals. In order to regulate the size of the drops, however, in practice use will be made of the prevailing pressures in the input pipes for compressed air and water. These can be converted with the aid of a model into the prevailing pressures in area 29. This model, which is needed for conversion purposes, can be experimentally determined using a single compressed-air sprayer. If accuracy demands, it may be adjusted for each compressed-air sprayer. In this way, the model which is needed for this conversion will be put to good use as part of the controls actively connected to the compressed-air regulators and water pressure regulators. Such a model does not need to be determined separately per se. It is also conceivable that a regulator will take account of this automatically after the regulating parameters have been adjusted.

Figure 2:
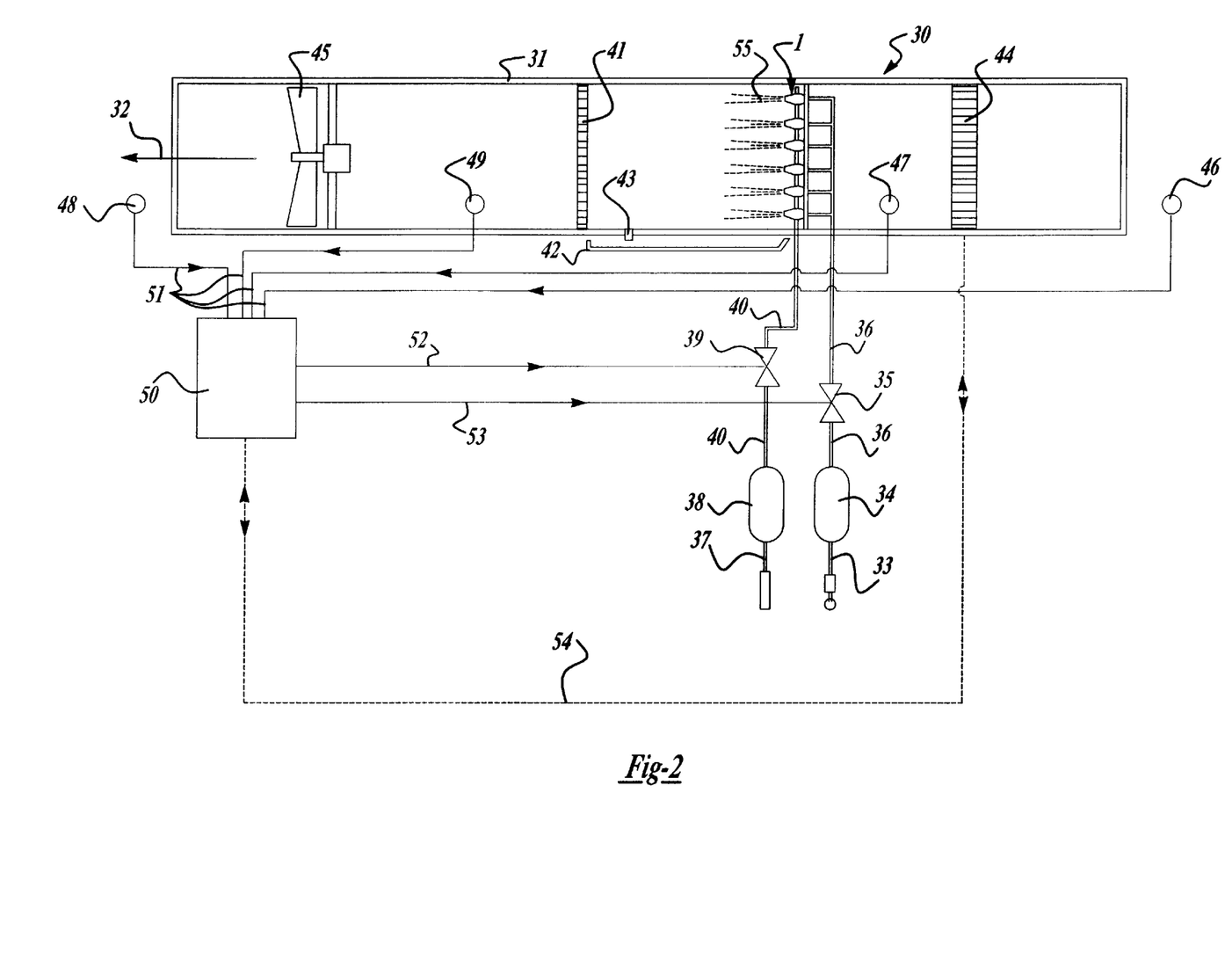
FIG. 2 is a diagrammatic view (partly in section) of a humidifying system according to the present invention.

By way of an example, FIG. 2 shows the workings of a humidifying system according to the present invention. The humidifying system shown in FIG. 2 contains a duct 31 through which air may be transported in the direction shown by the arrow 32 by means of a ventilator 45. In the duct 31, a number of compressed-air sprayers 1 (as were discussed with reference to FIG. 1) have been installed across the entire cross-section. These compressed-air sprayers 1 have been set up so that they are able to spray water along with the flow, as is diagrammatically shown with the spray 55. Downstream of the compressed-air sprayers 1, a drip catcher 41 (which may be a demister, for example) has been installed. This drip catcher 41 will hold back drops that are larger than a certain size that is allowed through 41. When this drip catcher 41 is correctly installed with respect to the compressed-air sprayers 1 and the compressed-air sprayers are correctly regulated (as was discussed in the introduction to this specification), it has more of a function as a safety measure than an actual active component. That is because with the correct placing of the compressed-air sprayers in combination with the appropriate control of them, the drops which arrive at the drip catcher 41 will already be smaller than the size that is allowed through. Should any bigger drops be caught by the drip catcher, or should there be any precipitation or condensation, a drain-water outlet 43 is fitted which discharges into a tank 42 for receiving the drain water.

The humidifying system 30 also contains one or more inlet-humidity sensors 46 and 47 and one or more outlet-humidity sensors 48 and 49. Depending upon the demands or additional requirements that are to be placed on the humidifying systems, these humidity sensors can either be placed in the duct 31 (i.e., inlet-humidity sensor 47 and outlet-humidity sensor 49) or outside it (i.e., inlet-humidity sensor 46 and outlet-humidity sensor 48). When the inlet-humidity sensor 46 is placed outside the duct, it is preferable that it is set up in such a way that it is able to measure the humidity of the air that is inputted into the duct 31 which is to be humidified. The outlet-humidity sensor 48 that is placed outside the duct may be set up in such a way that the humidified air that has come out of the duct 31 flows past it, but it may also be set up in a target area that is to be conditioned as far as its humidity is concerned. The humidity sensors 46, 47, 48 and 49 are connected via signalling cables 51 to micro-processors 50. These micro-processors 50 are able to regulate the pressure of the compressed-air and/or the water pressure in the compressed-air sprayer via signalling cables 52 and 53, as will be explained further.

As far as the power supply to the compressed-air sprayers is concerned, provision is made for it by there being a water input 33 which inputs water to a water pressure booster construction 34. In this water pressure booster construction (34) the water pressure is boosted up to a particularly high level, so that any fluctuations in pressure in the water input 33 to the compressed-air sprayers 1 will have no effect. Such a water pressure booster construction 34 is known in its own right as being state-of-the-art. From the water pressure booster construction 34, the water is further carried at high pressure through a pipe 36 to a water pressure regulating valve 35 so that it can then be carried through a pipe 36 to the compressed-air sprayers 1.

In order to power the compressed-air sprayers 1 with compressed-air, provision is made for an air input 37 which leads to a compressed-air generator 38 which is connected to the compressed-air sprayers 1 via a pipe 40. Pipe 40 contains a compressed-air pressure-regulating valve 39.

The compressed-air pressure-regulating valve 39 is connected to the micro-processor 50 via a signalling cable 52, and the water pressure-regulating valve 35 is connected to the micro-processor 50 via a signalling cable 53.

The micro-processor 50 is to be equipped with a thermodynamic model which may be stored in the form of a table or a formula in the micro-processor. Using this thermodynamic model (which can be empirically determined and which can be adjusted for each specific humidifying system by being fine-tuned), and on the basis of the humidity picked up by the humidity sensors (in accordance with the control rule(s) given in the conclusions accompanying this patent application), the valve 35 and/or 39 will be controlled for the purpose of increasing or reducing the difference in pressure (as measured in spaces 29 in the compressed-air sprayers) so that the size of drops of the spray can be varied, if desired. The micro-processor 50 can also be set in such a way that the size of drops is controlled (taking into account the evaporation of the drops) so that when they reach the drip catcher 41 they are smaller than the size it allows through. In this way, drain water is virtually, if not totally, eliminated.

The humidifying system such as this invention is may also be fitted with heaters 44 for the purpose of increasing the temperature of the air that is to be carried through the duct 31 to one which is usually desired in the target area. Because the humidity can be accurately regulated with the humidifying system that this invention is, it is possible to control the heaters 44 in such a way that they warm the air carried through the duct 31 to the compressed-air sprayers 1 to such a temperature that the temperature of the humidified air (after the fall in temperature which occurs as a consequence of the sprayed water evaporating) is equal to a particular desired temperature. As a result of the high degree of accuracy involved in regulating a humidifying system according to the present invention, the temperature regulator for the heaters 44 may work independently. With this invention, however, for the best possible fine-tuning of the temperature of the air it is beneficial when the temperature regulator for the heaters 44 works in conjunction with the micro-processor 50 or is even integrated into it. In the example of how it works shown in FIG. 2, the temperature regulator is integrated into the micro-processor 50, and it comes with a signalling cable 54 for carrying signals between the heaters 44 and the micro-processor 50.

When a gas burner, for example, is used for heaters 44, the air being carried will also absorb moisture and therefore its humidity will increase as a consequence of this heating. In such an event, it will be of benefit for the regulating of the humidifying system if an inlet-humidity sensor 47 is placed between the heaters 44 and the compressed-air sprayers 1.

Figure 3:
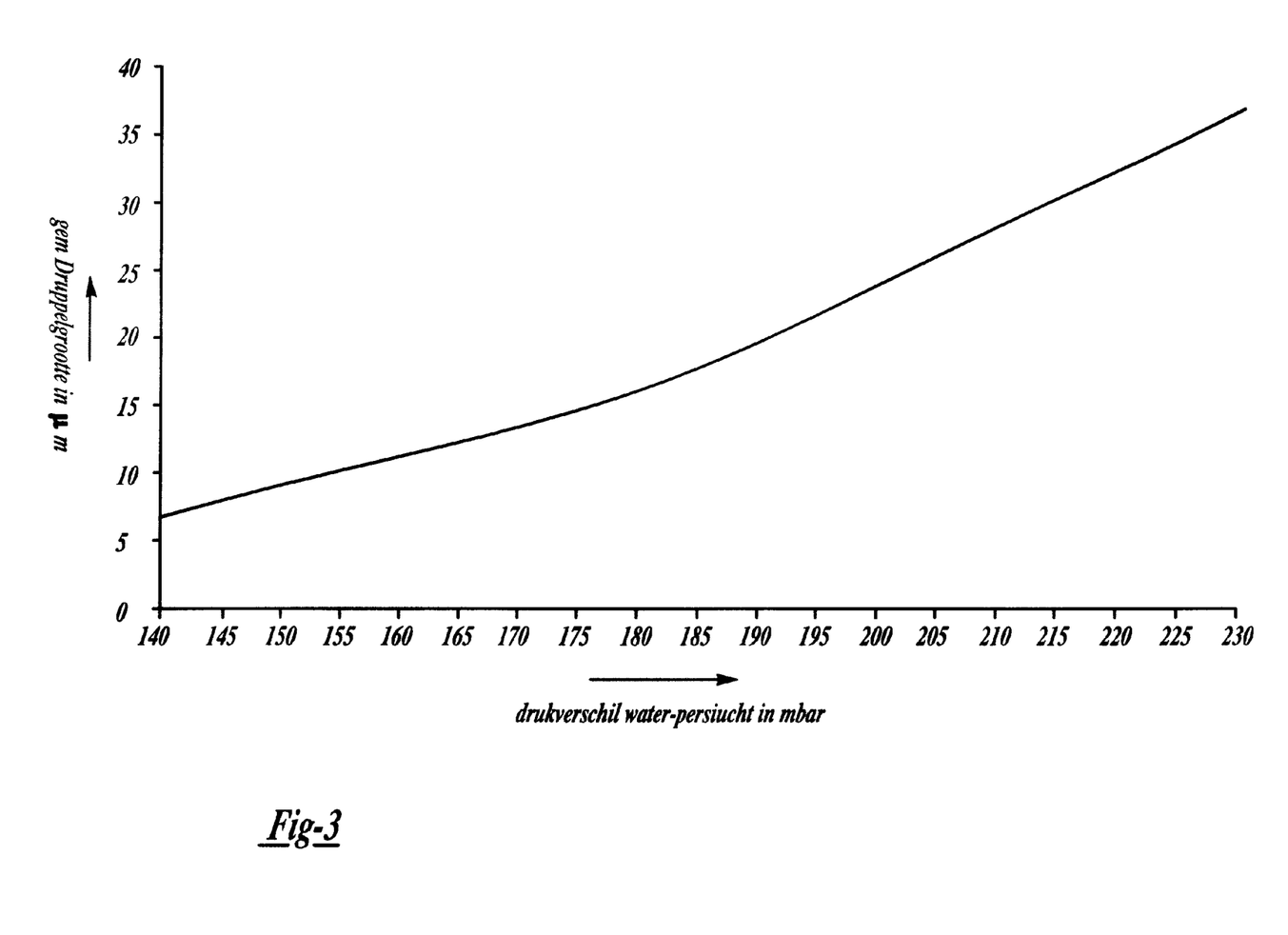
FIG. 3 is a diagram illustrating the relationship between the drop size and the difference in pressure between the water pressure and the pressure of the compressed air.

In FIG. 3, the connection is shown between the size of drops and the difference in pressure between the water pressure and the pressure of the compressed air. The diagram shown in FIG. 3 is a measurement for a compressed-air sprayer which is commercially available. (A cross-section of the sprayer is shown in FIG. 1.) The measurements (which have led to the results shown in FIG. 3) were made at a surrounding temperature (and therefore also an air temperature of 20° C.), the air having a relative humidity of 20% (or at least it did prior to spraying). Referring momentarily to FIG. 1, the drop size is measured here at point R at a distance d of 1 meter in front of outlet 4 of the compressed-air sprayer. The size of drop that was measured and shown in FIG. 3 is also an average size of drop expressed in mm. The humidity after spraying is not included among the measurements shown in FIG. 3 and was not measured. Moreover, in the measurements the pressure of the compressed air was kept constant at 2.6 bars. Specifically, an over-pressure of 2.6 bars was maintained with respect to the atmosphere. The pressure of the compressed air was also measured in air chamber 5, where the pressure of the compressed air was roughly the same as that in area 29. In the measurements, the water pressure was always higher than the pressure of the compressed air, meaning that it may be stated that the water pressure always corresponded to 2.6 bars plus the pressure difference shown in FIG. 3 horizontally in millibars. In the measurements for the diagram for FIG. 3, fresh air was sprayed at a temperature of 20° C. with a relative humidity of 20% constantly carried through to the sprayer. The values given in FIG. 3 were arrived at by measuring the average drop size associated with a different pressure difference at a distance of 1 meter from the sprayer each time. This was repeated at intervals of 5 millibars for a large number of pressure differences, and these were obtained by adjusting the water pressure on each occasion. The water pressure was also measured in space 19, and this gives a good indication of the water pressure prevailing in water outlet 26.

Figure 4:
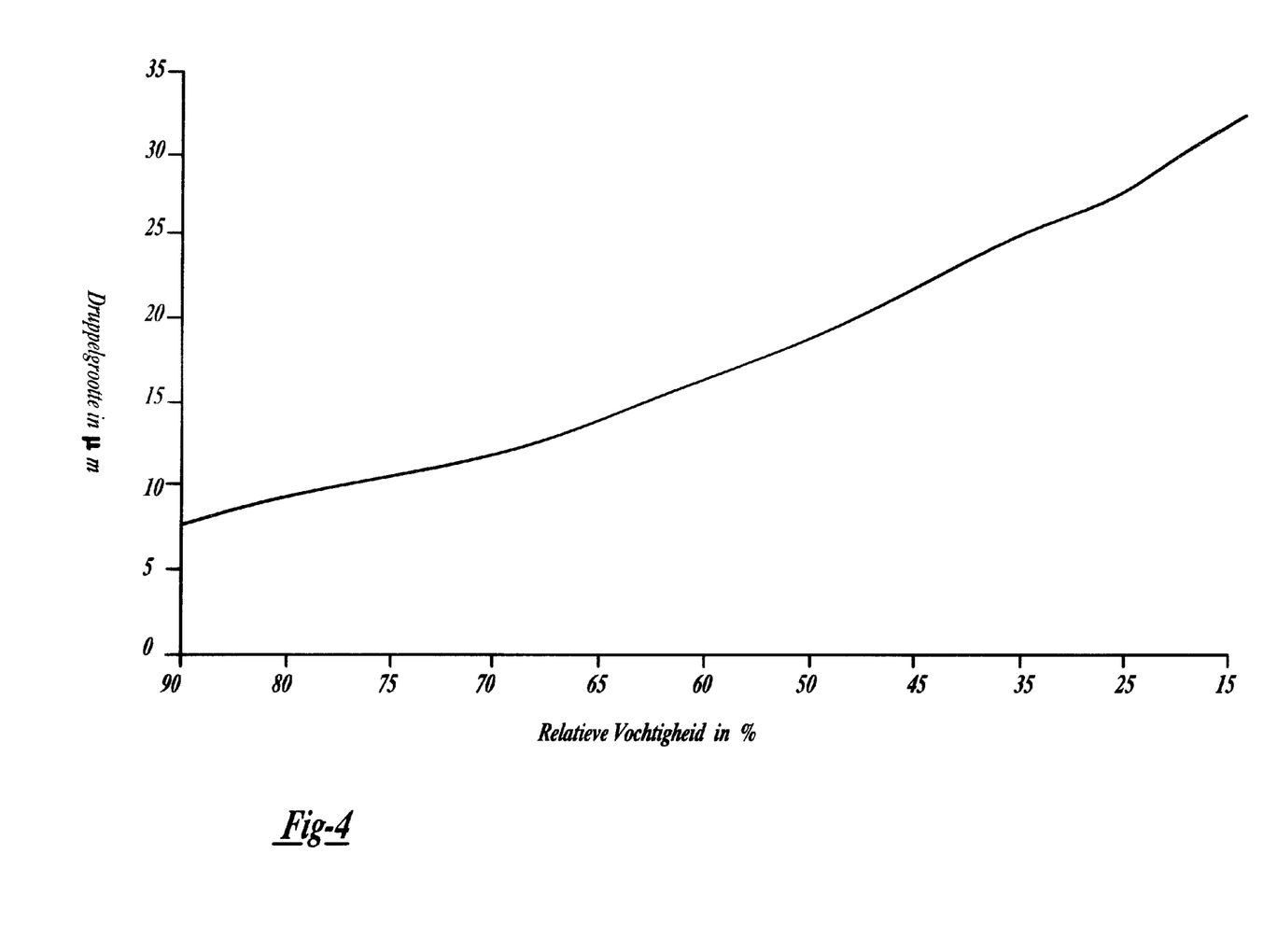
FIG. 4 is a diagram which illustrates the relationship between the drop size and the relative humidity.

The diagram in FIG. 4 shows a separate series of measurements which were taken under somewhat modified conditions. Once again, use was made of the commercially-available sprayer, shown in FIG. 1, and once again the temperature of the air in which the spraying took place was 20° C. The average drop size was measured in mm at the reference point R at a distance d of 1 meter in front of outlet 4. In contrast to the measurements shown in FIG. 3, for the measurements shown in FIG. 4 the relative humidity of the fresh air inputted into the sprayer was varied each time. Here, too, the relative humidity of the air after spraying has not been taken into consideration for the time being. In the measurements for FIG. 4, for various relative humidities (size of interval 5% Relative Humidity), the average drop size at point R was looked at to see how large it was, bearing in mind that one of the demands made is that at point R and beyond it no precipitation or discharging of condensation from the humidified air may take place. At such a drop size, therefore, a "thorough spraying" will just have taken place, in which there is no question of there being any drain water.

In that way, it may be measured, for example, that at a relative humidity of 60% and an air temperature of 20%, the drop size at point R at a distance d of 1 meter from outlet 4 may be a maximum of around 16.6 mm in order to meet the demand that no precipitation or discharging of condensation may take place. These average drop sizes have also been found at the various relative humidities by changing the drop size each time until precipitation took place.

The measurements pertaining to FIG. 3 and FIG. 4 were made in a duct which had fresh air (which fitted into the indicated parameters) passed through it in a single direction and in which water was sprayed along with the flow by the sprayer of FIG. 1. The airflow speed of the fresh air was approximately 2.5 m/sec.

As will be clear, on the basis of the measured values given in FIGS. 3 and 4, it is relatively simple to construct a control for a sprayer which meets the criteria of total evaporation. Specifically, every, or at least nearly every, precipitation of moisture or discharge of condensation is eliminated. The following method of using the system of the present invention may be employed:

The relative humidity of the air to be humidified (the so-called inlet-humidity) is 60%, for example. This means that according to FIG. 4, the average drop size may be a maximum of around 16.6 mm. For an average drop size of 16.6 mm, it may then be read from FIG. 3 that in that case the pressure difference is 182 millibars (or at least it is at a compressed-air pressure of 2.6 bars) and that means that the water pressure is 2.782 bars.

With such regulation, many opportunities for fine-tuning do, of course, exist. It is possible, for example, to take the desired final humidity into account, i.e., the outlet-humidity after spraying. It is also possible (and under certain conditions even advisable) to take this target value for the humidity as the criteria for the maximum average drop size.

It is also very conceivable that with further fine-tuning the drop size is to be regulated within a range (the maximum value for which is determined by one of the criteria discussed above) which depends upon the difference in the relative humidity between the inputted air (i.e., the inlet humidity) on the one hand and the removed air (i.e., the outlet humidity) on the other, or on any target value there may be for it. Taking inlet- or outlet-humidity criteria as a basis where it concerns the average drop size, the average drop size will then be regulated within a range of 0–16.6 mm, for example, or perhaps within a range of between 5 and 16.6 mm. When the difference in relative humidity between the desired outlet value, the target humidity and the humidity of the inputted air becomes higher, for the average drop size a higher value from outside the range of what is permissible will be taken or will be able to be taken. When this difference in pressure becomes smaller, a lower value from outside this range for the average drop size will be taken or will be able to be taken.

It will be clear to those skilled in the art that there are many conceivable variants for a method of regulation, all of which fall within the range of the extent of protection given in the conclusions accompanying this application.

Therefore, while this invention has been described in connection with particular examples thereof, the true scope of the invention should not be so limited since other modifications will become apparent to the skilled practitioner upon a study of the drawings, specification and following claims.

What is claimed is:

1. A humidifying system 30 containing:

at least one compressed-air sprayer 1 with a compressed-air input 2, a water input 30 and an outlet valve 4 for compressed air and water, one or more compressed-air pressure regulators 39 for regulating the pressure of the compressed air to be inputted and/or water pressure regulators 35 for regulating the pressure of the water to be inputted, at least one humidity sensor (46, 47, 48 and 49) for sensing the humidity of the humidified air or the air that is to be humidified, one or more controls 50 for controlling the compressed-air sprayer 1, the controls 50 being actively connected to at least one of the group consisting of the compressed-air pressure regulators 39 and the water pressure regulators 35 and to at least one humidity sensor 46, 47, 48 and 49, the controls being set to regulate (depending on the humidity picked up by the humidity sensors) the difference between the water pressure and the pressure of the compressed air by the appropriate controlling of the compressed-air pressure regulators and/or water pressure regulators (39 and 35 resp.) in such a way that the size of the drops sprayed by the compressed-air sprayer 1 varies depending on the humidity picked up by the humidity sensors 46, 47, 48 and 49 (of which there are at least one).

2. Humidifying system (30) according to claim 1, with the distinguishing feature that the humidity sensor (of which there is at least one) contains an outlet-humidity sensor (48 & 49) for sensing the humidity of the humidified air which is installed downstream from the compressed-air sprayer, and that the controls (50) are set up to increase the size of the drops in the spray when the humidity picked up by the outlet-humidity sensor (48 & 49) (of which there is at least one) is lower (or is becoming lower) and to reduce the size of the drops when the humidity that has been picked up is higher (or becoming higher).

3. Humidifying system according to one of claims 1 or 2, with the distinguishing feature that the humidity sensor (of which there is at least one) contains an inlet-humidity sensor (46 & 47) for sensing the humidity of the humidified air which is installed upstream from the compressed-air sprayer, and that the controls (50) are set up to increase the size of the drops in the spray when the humidity picked up by the inlet-humidity sensor (46 & 47) is lower (or is becoming lower) and to reduce the size of the drops when the humidity that has been picked up by the inlet-humidity sensor is higher (or becoming higher).

4. Humidifying system (30) according to claim 1, with the distinguishing feature that the compressed-air sprayer (1) (of which there is at least one) contains an air chamber (5) which has an outlet valve (4) and which is connected to the compressed-air input (2), which is installed in the air chamber (5) pointing towards the outlet valve (4) on a line with a water-jet nozzle (6) which is connected to the water input (3). The controls (50) are set up to control the compressed-air pressure regulators and/or water pressure regulators (39 & 35 resp.) in such a way that the water pressure is higher than or equal to the compressed-air pressure in the air chamber (5), close to the outlet (26)—in area 29—of the water-jet nozzle (6).

5. Humidifying system (30) according to claim 4, with the distinguishing feature that the controls (50) for increasing the size of the drops in the spray also control the water pressure regulators and/or compressed-air pressure regulators (35 & 39 resp.) in such a way that the difference between the water pressure and the pressure of the compressed air increases in the air chamber (5), close to the outlet (26) of the water-jet nozzle (6), and that for reducing the size of the drops, the controls (50) also control the water pressure regulators and compressed-air pressure regulators (35 & 39 resp.) in such a way that the difference decreases.

6. Humidifying system (30) according to claim 1, with the distinguishing feature that the controls (50) are set up to regulate (mainly without interruption) the size of drops in the spray (55) in order to maintain the humidity of the humidified air at a predetermined target value or to have it follow a predetermined set of target values.

7. Humidifying system (30) according to claim 1, with the distinguishing feature that the controls (50) are set up to regulate the size of drops in the spray (55) in such a way that at a predetermined distance from the outlet valve of the compressed-air sprayer (1), at least 95% (and preferably 100% or nearly 100%) of the drops are smaller than the predetermined maximum permissible value.

8. Humidifying system (30) according to claim 7, with the distinguishing feature that the humidifying system (30) contains a drip catcher (41) installed downstream of the compressed-air sprayer (1) (of which there is at least one) which catches drops that are larger than a certain size that is allowed through In this, the distance of the drip catcher (41) to the outlet valve (4) of the compressed-air sprayer (1) must be greater than or equal to the predetermined distance, and this predetermined maximum permissible value of the drop size must be smaller than or equal to the size the drip catcher (41) allows through.

9. Humidifying system (30) according to claim 1, with the distinguishing feature that:

- the humidifying system (30) also contains an air duct (31) which can have air passed through it in a particular direction (32),
- the compressed-air sprayer (1) (of which there is at least one) with its outlet valve (4) is directed into the duct,
- the humidity sensors contain at least one inlet-humidity sensor (46 & 47) which is installed upstream from the sprayer (1) for sensing the humidity of the inputted air that is to be humidified, and at least one outlet-humidity sensor (48 & 49) which is installed downstream from the sprayer (1) for sensing the humidity of the removed air that has been humidified,
- the controls (50) are set up to increase the size of drops in the spray in the air duct when the difference in the humidity picked up by the outlet-humidity sensor (48 & 49) minus the humidity picked up by the inlet-humidity sensor (46 & 47) is greater (or is becoming greater) and to reduce the size of the drops when this difference is smaller (or is becoming smaller).

10. Humidifying system (30) according to claim 9, with the distinguishing feature that upstream of the compressed-air sprayer (of which there is at least one), heaters (44) for warming the air that is to be inputted and humidified are installed, and that the heaters (44) are fitted with a temperature regulator which is set up to heat the air that is to be humidified to a temperature which generally corresponds to the temperature desired at the outlet of the air duct (31) plus the absolute value of the fall in temperature which occurs as a result of the heat being withdrawn from it through the evaporation of the sprayed drops.

11. Humidifying system (30) according to claim 10, with the distinguishing feature that either the temperature regulator and the controls (50) are linked or the temperature regulator is integrated into the controls (50).

12. Humidifying system (30) according to claim 1, with the distinguishing feature that the humidifying system (30) has a number of compressed-air sprayers (1) and that these compressed-air sprayers (1) may be controlled separately by the controls (50).

13. Application of a humidifying system (30) according to one of the claims 1, 2, 4–12 for conditioning the air, particularly the humidity in a paint or lacquering cabin: more specifically, ones that are used for painting and lacquering vehicles such as cars.

14. The operating procedure for humidifying air, in which water is sprayed with a compressed-air sprayer (1) (of which there is at least one), with a compressed-air input (2), a water input (30) and an outlet valve (4) for compressed air and water, and with which the humidity is determined, with the distinguishing feature that the difference between the water pressure and the pressure of the compressed air is regulated in such a way that the size of the drops in the spray varies depending on the particular humidity.

15. The operating procedure for humidifying the air according to claim 14, with the distinguishing feature that the size of the drops is increased or reduced when the particular humidity is lower or higher.

* * * * *